Figure 1:
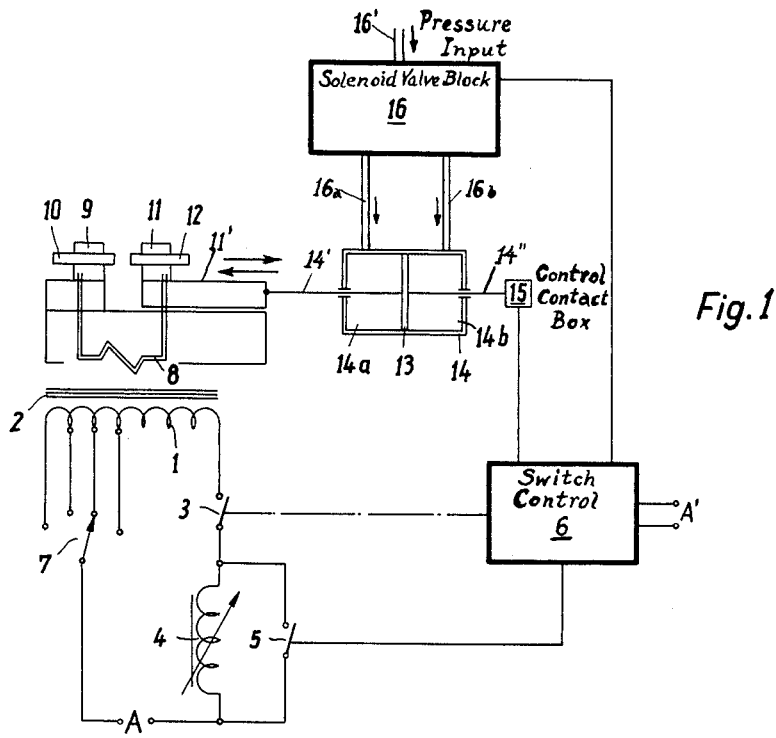

3,167,635
FLASH BUTT WELDING MACHINE
Hans Ulrich Neidhardt, Zurich, and Alfred Neukom,
  Dubendorf, Zurich, Switzerland, assignors to H. A.
  Schlatter A.G., Zollikon, Zurich, Switzerland
Filed Apr. 17, 1962, Ser. No. 188,137
Claims priority, application Switzerland, Apr. 14, 1961,
4,485/61
7 Claims. (Cl. 219—97)

The present invention concerns flash butt welding machines.

As is well-known, in flash butt welding operations (plain flash butt welding or flash butt welding with preheating) the flashing phase is effected by bringing the rough end faces of the workpieces (which are to be welded to each other and are respectively connected with a welding transformer) into loose contact with each other whereby projecting or irregular portions of these end faces are caused to burn away. While this takes place the loose contact between the workpieces is maintained during the flashing phase by feeding at least one of the workpieces toward the other at a predetermined suitable speed.

Of course the size and position of the contacting areas of the workpieces depend at the outset on unpredictable irregularities of the above-mentioned end faces of the workpieces which may be neither flat nor parallel with each other. The flashing current flowing across the contact area heats the material at or near the contact points to such a degree that these portions of the material burn away and are ejected together with considerable flash production. During this flashing phase the mutually abutting end faces of the workpieces are equalized and made to conform with each other while at the same time a certain distribution of temperature over these faces takes place. As soon as a temperature suitable for welding is reached the workpieces are pushed forcibly toward each other and upset to some degree while a suitably increased welding current passes through the welding area.

It has been found that for instance in flash butt welding of copper and other materials of high electric conductivity the undesirable effect arises that particularly during the last portion of the flashing phase excessive amounts of material are burnt away and ejected. As a result a recess develops in at least one of the end forces of the workpieces immediately before the start of the upsetting phase. Consequently oxidized material frequently accumulates along the edge of such a recess. Although the recess disappears during the upsetting phase the danger remains that such oxidized material forms an undesirable inclusion in the weld.

The above-described undesirable effect is favored by the fact that the first heated material reaches its melting temperature already upon comparatively small increase of temperature and therefore offers only small mechanical resistance to explosive flash phenomena. Particularly in the last portion of the flashing phase it is to be expected that comparatively large particles of material are ejected by spatter and thus create the above-mentioned recess. The mean value of the current required for the flashing phase is smaller than the welding current used during the upsetting phase and amounts to about ¼ to ⅓ of the latter. However the voltage required for producing the flashing current is still high enough for producing the above-described undesirable effect.

The present invention is based on the observation that the just-mentioned undesirable effect coincides with a sudden rise of the flashing current. Experiments have shown that the undesirable effect can be avoided reliably by preventing a sudden increase of the flashing current at the proper moment during the last portion of the flashing phase.

It is therefore one object of this invention to provide for a flash butt welding machine operating on the principle of resistance welding which comprises means for preventing a current rise during at least the last portion of the flashing phase.

It is another object of the invention to provide for an arrangement of the type set forth which is comparatively simple and entirely reliable in operation.

With above objects in view the invention includes a flash butt welding machine having means for moving workpieces into positions relative to each other as required for the flashing phase and the upsetting phase of a welding operation, comprising, in combination, electric energy supply means for applying the required voltages to the workpieces during the flashing and during the upsetting phases, respectively, of the welding operation; current rise preventing means connectable in said electric energy supply means; and control means for rendering said current rise preventing means operative when the workpieces are moved to a position corresponding to a predetermined moment within but before the end of the flashing phase of the welding operation and for rendering said current rise preventing means inoperative when the workpieces are moved into a position corresponding to the upsetting phase of the welding operation.

Figure 2:
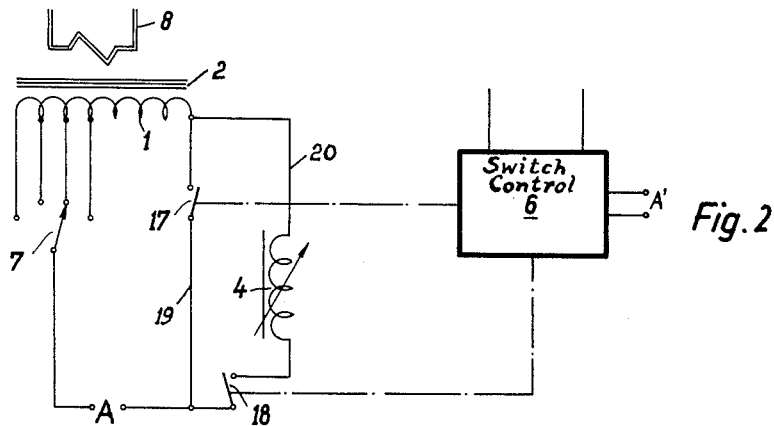

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

FIG. 1 is a diagrammatic illustration of an arrangement according to the invention; and FIG. 2 is a diagrammatic illustration of a certain modification of a portion of the arrangement according to FIG. 1.

In FIG. 1 all those portions of the welding machine which have nothing to do with the present invention have been left out in order not to encumber the illustration. As can be seen, two workpieces 10 and 12 which are to be butt welded together are held in clamping devices 9 and 11, respectively, of which the clamping device 9 may be stationary while the clamping device 11 may be mounted on a movable support 11' for being movable toward and away from the clamping device 9. A welding transformer 2 has a primary winding 1 and a secondary winding 8, the latter being connected with the clamping devices 9 and 11 and thereby with the workpieces 10 and 12, respectively. The primary winding 1 is supplied with energy at the required voltage from a source A. One portion of the primary winding 1 may be provided with taps which may be connected selectively by a selector switch 7 with the source A for varying the voltage input. The other end of the primary winding 1 is connected with the source A through a series combination of a switch and an impedance coil 4 which is preferably variable. A second switch 5 is connected in parallel with the impedance coil 4 so as to permit shunting of the latter by closing switch 5. The switches 3 and 5 are controlled by a switch control device 6 as described further below.

In the illustrated example the movement of the support 11' in either direction indicated by the arrows is effected by a piston 13 movable within a cylinder 14 in direction towards the right by introduction of pressure into the cylinder space 14a, and toward the left by introduction of pressure into the cylinder space 14b. The piston 13 is connected with the movable support 11′ by a piston rod 14′ which is extended in the opposite direction at 14″ so as to reach into a control contact box 15 as explained further below. Pressure is introduced into the spaces 14a and 14b from a pressure input 16′ through channels 16a and 16b, respectively, under the control of a solenoid valve block 16.

The control contact box 15 which might also be arranged to cooperate with the piston rod portion 14′, contains switch or contact means controlling the operation of the switch control 6 depending upon which one of the contacts in the control contact box are actuated by the piston rod 14″ in different positions thereof. Consequently the switch control 6 will be actuated in a predetermined relation with the positions assumed by the workpieces 10 and 12 relative to each other during the various phases of a welding operation.

The solenoid valves in the block 16 are actuated also by the switch control 6. The switch control 6 is of conventional type and adapted to open the valves in the block 16 in such a manner that forward and backward movement of the piston 13 and of the support 11′ is caused in appropriate sequence during a welding operation, the degree of opening the valve in block 16 determining the speed of movement of the support 11′ and consequently also of the workpiece 12 toward the workpiece 10. In particular, the forward speed of the workpiece 12 during the flashing phase is controlled in this manner and after the completion of the flashing phase the upsetting phase is initiated, similarly after the completion of the welding operation and removal of the welded pieces 10 and 12 from the clamping devices 9 and 11 the support 11′ is returned to a starting position in a similar manner.

The impedance coil 4 is preferably adjustable or variable as indicated by the arrow symbol. Variable impedance coils permitting adjustment of its inductance are well-known. For the purpose of adjustability the coil may have selectable taps and/or an iron core composed of two portions which are separated from each other by air gaps, the magnitude of these gaps being adjustable. In this manner the inductance of the impedance coil can be adjusted to correspond to the type of material to be welded and to the cross-sectional area of the workpieces 10 and 12 in such a manner that under all conditions an excessive flashing is prevented.

In operation the above-described machine operates as follows:

During the flashing phase and through the corresponding cooperation between the control contact box 15 and the switch control 6 the switch 3 is caused to be in closed position while the switch 5 is first of all held in open position. At the same time during this phase the switch control 6 actuates the solenoid valve block 16 in such a manner that the piston 13 and thereby the support 11′ with the clamping device 11 holding the workpiece 12 are caused to move toward the other workpiece 10.

It is evident that during this phase the connection of the impedance coil 4 in series with the primary winding 1 prevents a sudden rise of the flashing current and in this manner prevents the above-mentioned excessive burning away of material.

After the movement of the support 11′ and of the workpiece 12 through a distance predetermined for the flashing phase a contact in the control contact box 15 is actuated whereby the switch control 6 is caused to close the switch 5 whereby the impedance coil 4 is shunted. Simultaneously the switch control 6 actuates the respective valve in the solenoid valve block 16 in such a manner that now the upsetting phase is initiated. Since now the impedance coil 4 is shunted the current may now rise without any hindrance so as to comply with the current requirement for the upsetting phase.

FIG. 2 illustrates a modification of the arrangement of FIG. 1. In this case the above-mentioned other end of the primary winding 1 is connected directly through line 19 containing a switch 17 with the source A. The impedance coil 4 is connected in a circuit 20 bypassing the switch 17 and containing a switch 18. The switches 17 and 18 are controlled by the switch control 6. The operation is analogous to that one described above except that the impedance coil 4 is rendered operative when switch 17 is opened and switch 18 is closed. During the upsetting operation the switch 17 is closed and the switch 18 is opened.

The switches 3 and 5 in FIG. 1 and the switches 17 and 18 in FIG. 2 may be replaced by electronic switch means e.g. by ignitron contactors which are controlled and changed between conductive and non-conductive conditions in a well-known manner by the switch control 6.

It will be understood that each of the elements described above, or two or more together, may also find a useful application in other types of a flash butt welding machine differing from the types described above.

While the invention has been illustrated and described as embodied in a flash butt welding machine having means for moving workpieces into positions relative to each other as required for the flashing phase and the upsetting phase of a welding operation, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A flash butt welding machine having means for moving workpieces into positions relative to each other as required for the flashing phase and the upsetting phase of a welding operation, comprising, in combination, electric energy supply means for applying the required voltages to the workpieces during the flashing and during the upsetting phases, respectively, of the welding operation; current rise preventing means connectable in said electric energy supply means; and control means for rendering said current rise preventing means operative when the workpieces are moved into a position corresponding to a predetermined moment within but before the end of the flashing phase of the welding operation and for rendering said current rise preventing means inoperative when the workpieces are moved into a position corresponding to the upsetting phase of the welding operation.

2. A flash butt welding machine having means for moving workpieces into positions relative to each other as required for the flashing phase and the upsetting phase of a welding operation, comprising, in combination, electric energy supply means for applying the required voltages to the workpieces during the flashing and during the upsetting phases, respectively, of the welding operation; impedance coil means connectable in series with said electric energy supply means; and control means for rendering said impedance coil means operative when the workpieces are moved into a position corresponding to a predetermined moment within but before the end of the flashing phase of the welding operation and for rendering said impedance coil means inoperative when the workpieces are moved into a position corresponding to the upsetting phase of the welding operation.

3. A flash butt welding machine having means for moving workpieces into positions relative to each other as required for the flashing phase and the upsetting phase of a welding operation, comprising, in combination, electric energy supply means for applying the required voltages to the workpieces during the flashing and during the upsetting phases, respectively, of the welding operation; impedance coil means of variable inductance connectable in series with said electric energy supply means; and control means for rendering said impedance coil means of variable inductance operative when the workpieces are moved into a position corresponding to a predetermined moment within but before the end of the flashing phase of the welding operation and for rendering said impedance coil means inoperative when the workpieces are moved into a position corresponding to the upsetting phase of the welding operation.

4. A flash butt welding machine having means for moving workpieces into positions relative to each other as required for the flashing phase and the upsetting phase of a welding operation, comprising, in combination, electric energy supply means including transformer means having a primary winding and a secondary winding, the latter being connected with the workpieces for applying the required voltages to the workpieces during the flashing and during the upsetting phases, respectively, of the welding operation; impedance coil means connectable in series with said primary winding in said electric energy supply means; and control means for rendering said impedance coil means of variable inductance operative when the workpieces are moved into a position corresponding to a predetermined moment within but before the end of the flashing phase of the welding operation and for rendering said impedance coil means inoperative when the workpieces are moved into a position corresponding to the upsetting phase of the welding operation.

5. A flash butt welding machine having means for moving workpieces into positions relative to each other as required for the flashing phase and the upsetting phase of a welding operation, comprising, in combination, electric energy supply means including transformer means having a primary winding and a secondary winding, the latter being connected with the workpieces for applying the required voltages to the workpieces during the flashing and during the upsetting phases, respectively, of the welding operation; impedance coil means of variable inductance connectable in series with said primary winding in said electric energy supply means; and control means for rendering said impedance coil means operative when the workpieces are moved into a position corresponding to a predetermined moment within but before the end of the flashing phase of the welding operation and for rendering said impedance coil means inoperative when the workpieces are moved into a position corresponding to the upsetting phase of the welding operation, said control means including switch means connected in parallel with said impedance coil means for shunting the latter when its operativeness is not required, and for connecting the same in series with said primary winding when its operativeness is required.

6. A flash butt welding machine having means for moving workpieces into positions relative to each other as required for the flashing phase and the upsetting phase of a welding operation, comprising, in combination, electric energy supply means including transformer means having a primary winding and a secondary winding, the latter being connected with the workpieces for applying the required voltages to the workpieces during the flashing and during the upsetting phases, respectively, of the welding operation; impedance coil means connectable in series with said primary winding in said electric energy supply means; and control means for rendering said impedance coil means of variable inductance operative when the workpieces are moved into a position corresponding to a predetermined moment within but before the end of the flashing phase of the welding operation and for rendering said impedance coil means inoperative when the workpieces are moved into a position corresponding to the upsetting phase of the welding operation, said control means including switch means for connecting said impedance coil means in series with said primary winding when required.

7. A flash butt welding machine adapted to carry out a welding operation in at least one flashing and one upsetting phase, comprising, in combination, at least two clamping means for holding workpieces to be welded to each other in required alignment, at least one of said clamping means being movable for forcing said workpieces toward each other during a welding operation; power means for moving said one clamping means between different positions respectively corresponding to the flashing and upsetting phases of a welding operation; electric energy supply means for applying the required voltages to said workpieces during the flashing and during the upsetting phases, respectively; and control means cooperating with said electric energy supply means for preventing a sudden current increase during a predetermined end portion of said flashing phase, said control means including current rise preventing means connected in said electric energy supply means, and switch means controlled by the movement of said one clamping means for rendering said current rise preventing means operative only when said one clamping means is moved into a position corresponding to said predetermined end portion of said flashing phase.

References Cited by the Examiner
UNITED STATES PATENTS

| | | | |
|---|---|---|---|
| 2,085,049 | 6/37 | Spire | 219—97 |
| 2,488,899 | 3/49 | Cooper et al. | 219—97 |
| 2,892,926 | 6/59 | Riley et al. | 219—151 |

RICHARD M. WOOD, *Primary Examiner.*